(12) United States Patent
Das et al.

(10) Patent No.: US 8,024,479 B2
(45) Date of Patent: *Sep. 20, 2011

(54) SYSTEM AND METHOD FOR DISTRIBUTING INFORMATION IN A NETWORK ENVIRONMENT

(75) Inventors: Amitava Das, Chapel Hill, NC (US); Viren K. Malaviya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 564 days.

This patent is subject to a terminal disclaimer.

(21) Appl. No.: 11/735,647

(22) Filed: Apr. 16, 2007

(65) Prior Publication Data

US 2007/0186280 A1 Aug. 9, 2007

Related U.S. Application Data

(63) Continuation of application No. 10/421,488, filed on Apr. 22, 2003, now Pat. No. 7,222,195.

(51) Int. Cl.
*G06F 15/16* (2006.01)

(52) U.S. Cl. ........ 709/240; 709/203; 709/217; 709/218; 709/219; 709/238; 709/242; 709/249

(58) Field of Classification Search .................. 709/203, 709/206, 217, 218, 219, 238, 249; 717/168; 705/40

See application file for complete search history.

(56) References Cited

U.S. PATENT DOCUMENTS

| | | | |
|---|---|---|---|
| 5,646,982 A * | 7/1997 | Hogan et al. | 379/88.22 |
| 5,933,425 A | 8/1999 | Iwata | |
| 5,940,598 A | 8/1999 | Strauss et al. | 395/200.79 |
| 6,006,264 A | 12/1999 | Colby et al. | |
| 6,185,619 B1 * | 2/2001 | Joffe et al. | 709/229 |
| 6,260,067 B1 | 7/2001 | Barnhouse et al. | 709/224 |
| 6,327,622 B1 | 12/2001 | Jindal et al. | 709/228 |
| 6,412,079 B1 | 6/2002 | Edmonds et al. | 714/11 |
| 6,453,468 B1 | 9/2002 | D'Souza | 717/168 |
| 6,463,454 B1 | 10/2002 | Lumelsky et al. | 718/105 |
| 6,483,912 B1 | 11/2002 | Kalmanek, Jr. et al. | 379/219 |
| 6,529,959 B1 | 3/2003 | Armistead et al. | 709/238 |
| 6,539,029 B1 | 3/2003 | Toivanen | 370/466 |

(Continued)

FOREIGN PATENT DOCUMENTS

WO WO 02/13479 2/2002

(Continued)

OTHER PUBLICATIONS

PCT, "Notification of Transmittal of the International Search Report and the Written Opinion of the International Searching Authority, or the Declaration," International Application No. PCT/US04/12175, 8 pgs., Apr. 20, 2004.

(Continued)

*Primary Examiner* — Yves Dalencourt
(74) *Attorney, Agent, or Firm* — Baker Botts L.L.P.

(57) ABSTRACT

A method for distributing information in a network environment is provided that includes receiving a communication flow and executing a routing decision for the communication flow that directs the communication flow to a selected one of a plurality of servers. The routing decision is based on a selected one or more user-specified parameters and on one or more data segments that reflect feedback associated with one or more of the servers. The feedback indicates one or more conditions associated with one or more of the servers.

15 Claims, 2 Drawing Sheets

U.S. PATENT DOCUMENTS

| | | |
|---|---|---|
| 6,542,593 B1 | 4/2003 | Bowman-Amuah ..... 379/201.03 |
| 6,606,643 B1 | 8/2003 | Emens et al. ................. 709/203 |
| 6,965,777 B1 * | 11/2005 | Cast et al. ..................... 455/466 |
| 2002/0145981 A1 | 10/2002 | Klinker et al. ................ 370/244 |
| 2003/0088529 A1 | 5/2003 | Klinker et al. ..................... 706/3 |
| 2007/0156656 A1 * | 7/2007 | Pather et al. ....................... 707/3 |

FOREIGN PATENT DOCUMENTS

| | | |
|---|---|---|
| WO | WO 02/17034 | 2/2002 |

OTHER PUBLICATIONS

EPO Communication/Supplementary Search Report under Article 153(7) EPC, Application No. 04760044.0-2211/1616268; PCT/US2004012175, 3 pages, Mar. 16, 2009.

Communication pursuant to Article 94(3) EPC, Application No. 04 760 044.0-2211; Ref. P28075EP-PCT/IK, 5 pages, Mar. 30, 2010.

* cited by examiner

SYSTEM AND METHOD FOR DISTRIBUTING INFORMATION IN A NETWORK ENVIRONMENT

CROSS-REFERENCE TO RELATED APPLICATION

This application is a continuation of U.S. application Ser. No. 10/421,488 filed Apr. 22, 2003 and entitled "System and Method for Distributing Information in a Network Environment".

TECHNICAL FIELD OF THE INVENTION

This invention relates in general to network communications, and more particularly to system and method for distributing information in a network environment.

BACKGROUND OF THE INVENTION

Network communications have become increasingly important in today's society. One aspect associated with communications relates to information distribution. In certain scenarios, bursts of information or sudden peaks in call or session volume may overwhelm network nodes or information gateways. In addition, heavy traffic may inhibit system performance by restricting communication flows and eliminating the ability to provide enhanced services to selected end users, subscribers, or components. Moreover, the ineffective distribution of data not only results in certain elements being overwhelmed, but may further provide an environment in which network resources may be underutilized or remain stagnant as other inferior components or devices are flooded with information that is unable to be processed. Accordingly, the ability to provide an information distribution architecture that efficiently manages data provides a significant challenge to network operators and system designers in the communications industry.

SUMMARY OF THE INVENTION

From the foregoing, it may be appreciated by those skilled in the art that a need has arisen for an improved information distribution approach that efficiently manages or processes data in a network environment. In accordance with one embodiment of the present invention, a system and method for distributing data are provided that substantially eliminate or greatly reduce disadvantages and problems associated with conventional information distribution techniques.

In accordance with the present invention, a method for distributing data is provided that includes receiving a communication flow and executing a routing decision for the communication flow that directs the communication flow to a selected one of a plurality of servers. The routing decision is based on a selected one or more user-specified parameters and on one or more data segments that reflect feedback associated with one or more of the servers. The feedback indicates one or more conditions associated with one or more of the servers.

Certain embodiments of the present invention may provide a number of technical advantages. For example, in accordance with one embodiment of the present invention, an information distribution approach is provided that takes advantage of network resources in routing data or information to optimal locations. This may be due, in part, to a data gateway architecture that allows user specified (user-configurable) parameters to be accounted for in making an information distribution decision. Such an architecture may provide significant flexibility and versatility as the data gateway may target or select specific information for routing to particular locations or for processing information in a designated manner. Accordingly, a user may designate certain network parameters as important in the routing or in the distribution of data.

Another technical advantage associated with one embodiment of the present invention relates to efficiency. The architecture provided by the data gateway may effectuate routing decisions based on information provided by a plurality of servers, which may be receiving the information from the data gateway. For example, a given server may communicate to the data gateway that it has the capacity to handle additional communication flows or particular types of information. Conversely, a server may communicate to the data gateway that it is being removed from operation for systematic administration or maintenance protocols and therefore should not receive future communication flows. A number of additional criteria or characteristics may also be communicated to the data gateway such that the data gateway considers this information (along with any other pertinent information) in order to execute an appropriate information distribution decision. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
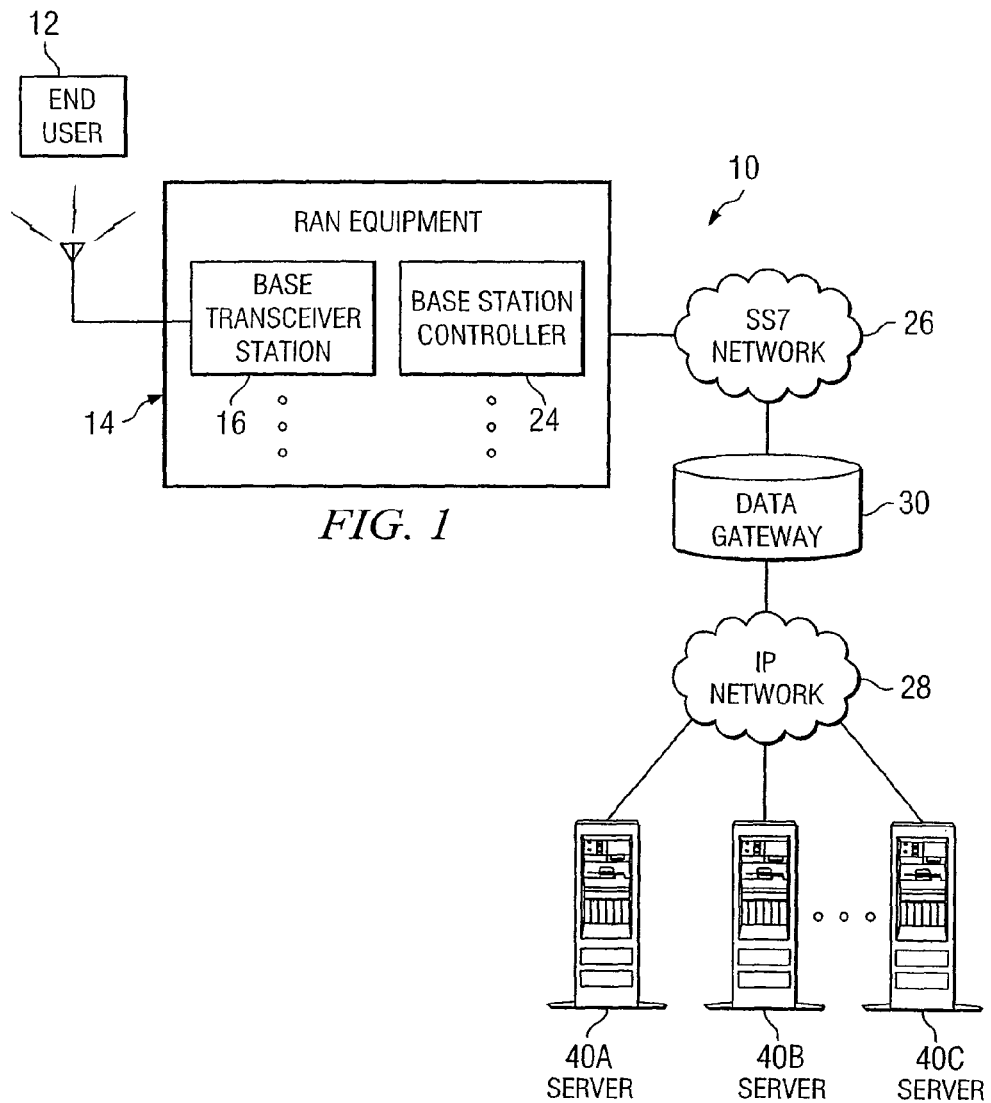
FIG. 1 is a simplified block diagram of a communication system for distributing information in a network environment.

FIG. 1 is a simplified block diagram of a communication system 10 for distributing data in a network environment in accordance with one embodiment of the present invention. Communication system 10 may include an end user 12 and a set of radio access network (RAN) equipment 14, which may include a plurality of base transceiver stations 16 and a plurality of base station controllers 24. Communication system 10 may additionally include an SS7 network 26, an Internet protocol (IP) network 28, and a data gateway 30. Communication system 10 may additionally include a plurality of servers 40a-c that may receive information from, and be properly coupled to, IP network 28 in any suitable manner.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with a first generation, 2G, or 3G network, where equivalent networking equipment is provided in the architecture. Communication system 10 is versatile in that it may be used in a host of communication environments that seek to distribute data or information.

According to the teachings of the present invention, data gateway 30 provides a platform in which a routing decision may be made for traffic flows based on a number of criteria or elements. For example, data gateway 30 may route information or data based on standard routing parameters, user-specified routing parameters, data segments communicated by one or more servers 40a-c that reflect server feedback, or any combination of these elements. Traffic distribution may then be modified based on any one or more of these characteristics or settings that are provided to data gateway 30. Data gateway 30 may utilize information provided by a network administrator or system operator in targeting specific information to be delivered to selected servers 40a-c. Additionally, static or dynamic feedback may be provided by servers 40a-c in order to route information in an optimal or efficient manner. In addition, data gateway may take into account any other network characteristics or routing criteria in order to effectuate an information distribution decision.

Communication system 10 provides an information distribution approach that takes advantage of network resources in routing data to optimal locations. This may be due, in part, to data gateway 30, which may allow user specified (i.e. user-configurable or user-selected) parameters to be accounted for in making an information routing decision. The parameter may reside, for example, in protocol layers of an incoming message, e.g. a called party global title address being used in conjunction with a protocol identifier. The operation of data gateway 30 may provide significant flexibility and versatility to a given communication architecture as it may target particular information for specific routing or management protocols. Accordingly, a user may designate certain network protocol parameters or characteristics as important in the routing or in the distribution of data.

Communication system 10 may also provide a more efficient approach to routing traffic flows because of the capabilities of data gateway 30 in accounting for feedback information provided by servers 40a-c in executing routing decisions. For example, a given server 40a-c may communicate to data gateway 30 that it has the capacity to handle additional communication flows or particular types of data. Conversely, one or more of servers 40a-c may communicate to data gateway 30 that they are being removed from operation for systematic administration, security, or maintenance protocols and therefore should not receive future communication flows. A number of additional criteria or characteristics may be communicated to data gateway 30 such that it considers this information (along with any other pertinent information) in order to execute an information distribution decision. In a broad sense, communication system 10 is generic and distributed in offering considerable flexibility in routing, call/session admission control, data management, and overload control for any suitable network. Moreover, the capabilities provided by communication system 10 are centric (i.e. complete) in addressing network deficiencies as a whole to deliver information optimally to its intended (or most appropriate) destination.

End user 12 is an entity, such as a client, a subscriber, or a customer wishing to initiate a communication session or data exchange in communication system 10 via any suitable network. End user 12 may operate to use any suitable device for communications in communication system 10. For example, end user 12 may initiate a communication using an electronic notebook, a personal computer, a personal digital assistant (PDA), any suitable cellular telephone or mobile station, a standard telephone, or any other suitable device (that may or may not be wireless), component, element, or object capable of initiating voice or data exchanges within communication system 10. End user 12 may also be inclusive of any suitable interface to the human user or to a computer, such as a display, microphone, keyboard, or other suitable terminal equipment (such as for example an interface to a personal computer or to a facsimile machine in cases where end user 12 is using a modem). End user 12 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as end user 12 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between a mobile switching center and base station controllers 24.

In operation, communication system 10 may include multiple cell sites that communicate with multiple end users 12 using base transceiver stations 16. A central office site may use an aggregation node (e.g. a router or switch) and base station controllers 24 for communicating with the cell site. One or more network management systems may be coupled to either the cell site and the central office site (or both as desired), whereby a mobile switching center provides an interface between base station controllers 24 (of the central office site) and a public switched telephone network (PSTN), IP network 28, and/or any other suitable communication network. Base transceiver stations 16 may be coupled to a cell site router by a T1/E1 line or any other suitable communication link or element operable to facilitate data exchanges.

Base station controllers 24 generally operate as management components for a radio interface. This may be done through remote commands to a corresponding base transceiver station within a mobile network. One base station controller 24 may manage more than one base transceiver station 16. Some of the responsibilities of base station controllers 24 may include management of radio channels and assisting in handover scenarios. Base transceiver stations 16 and base station controllers 24 may cooperate to provide connectivity for end user 12 to SS7 network 26.

SS7 network 26 is a communications interface providing a communications platform or pathway between end user 12 and data gateway 30. For example, using a PSTN architecture, SS7 network 26 may position information required to set up and manage the calls or sessions in an appropriate network, which may or may not be the network in which the telephone call originated. SS7 network 26 may implement out-of-band signaling allowing control information to travel on separate channels, rather than within the same channel as the call or session. Alternatively, SS7 network 26 may be deleted or replaced with any suitable network that facilitates communications between end user 12 and data gateway 30. Moreover, SS7 network 26 may be repositioned in communication system 10 such that it provides suitable connectivity to end user 12 or such that it facilitates the delivery or transmission of information in accordance with particular needs.

IP network 28 is a series of points or nodes of interconnected communication paths for receiving and transmitting packets of information that propagate through communication system 10. IP network 28 offers a communications interface between multiple end users 12 and any other suitable network equipment. IP network 28 may be any local area network (LAN), metropolitan area network (MAN), wide area network (WAN), wireless local area network (WLAN), virtual private network (VPN) or any other appropriate architecture or system that facilitates communications in a network environment. IP network 28 implements a transmission control protocol/internet protocol (TCP/IP) communication language protocol in a particular embodiment of the present invention. However, IP network 28 may alternatively implement any other suitable communications protocol for transmitting and receiving data packets within communication system 10.

Data gateway 30 is a communications element that may provide access for end user 12 to an internet, intranet, servers 40*a-c*, wireless application protocol (WAP) servers, or any other suitable platform, element, device or component. For example, data gateway 30 may be a packet data serving node (PDSN) or, in the case of a GSM environment, data gateway 30 may be a serving GPRS support node (SGSN). Alternatively, data gateway 30 may be a router, a switch, a bridge, a gateway, a loadbalancer, or any other object operable to facilitate a data exchange in a network environment. Data gateway may also provide an access gateway for devices implemented by end user 12 and for IP network 28. Data gateway 30 may further provide foreign agent support and packet transport for virtual private networking or for any other suitable networking configuration where appropriate. In certain embodiments, data gateway 30 may also assist in authenticating and authorizing end user 12 before being permitted to communicate in communication system 10.

Data gateway 30 may be operable to execute a routing decision based on standard routing parameters. Data gateway 30 may also route or otherwise direct information based on user-specified parameters potentially via a user-specified protocol (that may be implemented with or without standard routing parameters). Additionally, data gateway 30 may be capable of modifying its traffic distribution to the server group represented by servers 40*a-c* based on data segments reflecting feedback, which may be provided in real-time, communicated to data gateway 30 by servers 40*a-c*. Data gateway 30 may analyze the feedback and the user information received from a remote network, such as a mobile network included within RAN equipment 14, to deliver the data to one of many servers 40*a-c* that may be geographically distributed or co-located with data gateway 30. For example, in order to determine which of servers 40*a-c* are to receive data, data gateway 30 may consider a user-specified protocol (e.g. Mobile Application Part (MAP) protocols or processes), user-specified parameters (e.g. user identity, called party address, international mobile subscriber identity (IMSI)), transport level source and destination IP address (e.g. stream control transmission protocol (SCTP) stream IP address associated with a given server 40*a-c*), server specified data (e.g. central processing unit (CPU) speed, memory characteristics, capacity parameters, current load of transaction per second, etc.), causation criteria (e.g. a server in a routine maintenance, security or administration mode, or an internet protocol transfer point (ITP) requests a given server to transgress into a gradual shutdown mode), or any other suitable information in accordance with particular needs.

In operation, data gateway 30 distributes information based on criteria provided by a number of sources. Data gateway 30 may parse upper layers of communication and view/extract various parameters such that information distribution may be controlled by a network operator. Such an entity (i.e. the network operator) may be working at the edge of a network and reflect the entity that delivers a given service to a network or end user 12. The user-specified (or user-selected) parameters may reflect a number of criteria, such as a given server 40*a-c* being more powerful than other servers or being more capable of handling robust communications or specific types of communications. Accordingly, a number of weights may be assigned to each given server 40*a-c* in order to indicate the capabilities thereof. The weights, or any other suitable ranking protocol, may be provided to data gateway 30 in any suitable format or protocol.

Data gateway 30 may incorporate intelligence (via suitable hardware or software) into its architecture that considers (or synthesizes) information provided to it from servers 40*a-c*, which may be receiving data, information, or messages from data gateway 30. The signals or information being provided by servers 40*a-c* to data gateway 30 may be based on a static configuration of servers 40*a-c* such that information is provided on a systematic or routine basis. Alternatively servers 40*a-c* may be autonomous in being able to provide current (i.e. real-time) or dynamic information quickly to (and unsolicited by) data gateway 30 in an independent manner. Thus, such information may be provided dynamically based on a current condition or characteristic associated with a particular server. This may allow for 'on the fly' distribution of information. For example, a given server 40*a-c* may indicate that it is incapable of receiving communications at this time, or that it is being disabled for administrative reasons. The particular server may indicate to data gateway 30 that data gateway 30 should cease sending information to it for a given time interval. Alternatively, the particular server may communicate messages that restrict the incoming information to a certain rate or specify a maximum jitter. Additionally, the given server may specify tolerances (e.g. a burst rate, a delay parameter, or a variance in information flow) that it may be capable of accommodating.

Servers 40*a-c* are network elements operable to provide a service or capability for IP network 28, data gateway 30, or end user 12. Servers 40*a-c* may provide a messaging platform or a communications interface for the transmission and reception of data or information. Servers 40*a-c* may be particular to a specified protocol (e.g. WAP) or generic and be able to accommodate multiple protocols based on particular networking needs. Servers 40*a-c* may be provided with suitable software or hardware that allows each of them to communicate effectively with data gateway 30.

In one embodiment, a protocol may be defined between servers 40*a-c* and data gateway 30 (with potential use of an application program interface (API)) such that data exchanges are facilitated. Servers 40*a-c* may be mixed and matched, where appropriate, to accommodate older or legacy architectures, and be further configured such that any given entity may glean information from servers 40*a-c*. Servers 40*a-c* may alternatively be any service control point, data mining server, database, repository, storage area network (SAN), or any other suitable network, component, device, element, or object operable to provide some service or offer a communications platform to end user 12. Additionally, servers 40*a-c* may include any suitable software, hardware, APIs, algorithms, elements, or objects operable to facilitate the operations thereof.

Figure 2:
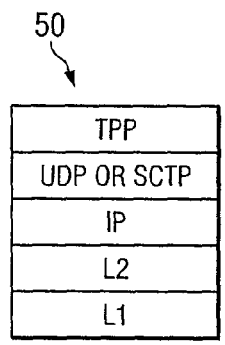
FIG. 2 is a simplified block diagram of an example protocol stack associated with the communication system.

FIG. 2 is a simplified block diagram of an example protocol stack 50 that is associated with communication system 10. Servers 40*a-c* may have operational parameters or criteria that are exchanged via a throughput performance protocol (TPP) between data gateway 30 and servers 40*a-c*. Alternatively, any other suitable communications protocol may be used in order to exchange this information. A TPP message may carry any suitable feedback data, as described above, whereby the TPP message is stacked on top of a user datagram protocol (UDP) or an SCTP protocol for example. Alternatively, such a protocol may be stacked on any other suitable protocol or layer where appropriate and in according with particular needs. The TPP and UDP (or SCTP) layers may be further stacked on an IP layer, a layer two segment, and a layer one segment. The TPP may be used for exchanging valuable information such that data gateway 30 is able to provide a number of distribution capabilities to communication system 10. For example, data gateway 30 may use the information to regulate or to throttle data traffic to a given server 40*a-c* based on current prevailing conditions. Data gateway 30 may also distribute the data traffic intelligently to servers 40*a-c* to prevent interruption of data delivery. This may allow data gateway 30 to gradually restrict one or more remote servers 40*a-c* by sending the corresponding server a proper cause and, from that point forward, no longer presenting data traffic to the disabled server until upgrade activities have been completed or the server has been restored to normal/stable conditions. This scenario may be easily achieved without impacting the network. The designated server 40*a-c* being restricted may send data gateway 30 a request (with the proper cause) and data gateway 30 may respond by not presenting traffic for data gateway 30 until a resume message is received from the given server.

Data gateway 30 may also ensure service delivery without interruption and bring resiliency to overall network architectures that rely on underlying IP networks, which may be susceptible to one or more vulnerabilities experienced as a result of an inadequate routing process. For example, a cluster of five or more servers may be configured identically (e.g. substantially the same CPU, memory, capacity, etc.) in communication system 10 whereby data gateway 30 executes round-robin traffic distribution using a corresponding algorithm. Alternatively, in cases where the servers have particular capabilities or characteristics, data gateway 30 may execute any other suitable distribution protocol that takes into account the particular parameter associated with the ability of a given server 40*a-c*.

Figure 3:
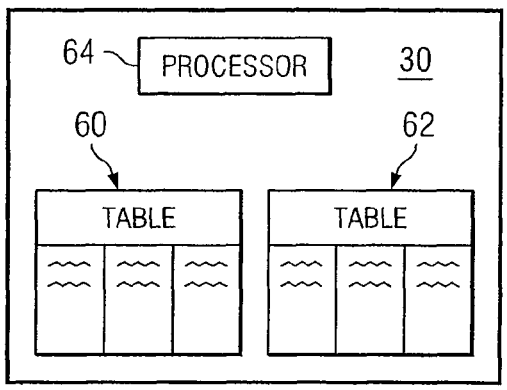
FIG. 3 is a simplified block diagram of an example configuration associated with a data gateway included within the communication system.

FIG. 3 is a simplified block diagram of data gateway 30 in accordance with one embodiment of the present invention. Data gateway 30 may include a set of tables 60 and 62 and a processor 64. Data gateway may also include any other component, element, hardware, software, algorithm, or object operable to facilitate the operations thereof. The interface provided by data gateway 30 may be used internally by processor 64, a feature control server, or a receiver of the target traffic, for example, to set or update the criteria used in distributing data.

Table 60 may include a number of columns of criteria that may be matched to a given communication flow or stream of incoming information. The rows of table 60 may provide values of various parameters or criteria, whereby each row may reflect a set of criteria. When an incoming message or communication flow is received by data gateway 30, it may be properly parsed and evaluated to see if a given communication flow matches a set of criteria, necessitating or resulting in an action. The action may be to route or to direct that particular information flow to a given server 40*a-c*. The last column of table 60 may correspond to the address of a given server 40*a-c* that is to receive the designated communication.

Table 62 may provide a suitable data structure that maintains feedback information for each server 40*a-c*. For example, table 62 may include stored information or data segments, related to capacity, processing capabilities, memory, potential maintenance occurring, or any other suitable parameter or characteristic that reflects a condition associated with a given server 40*a-c*. Accordingly, data gateway 30 is provided with two data structures or tables (60 and 62), which allow it to assess a given situation in order to properly direct information or data in communication system 10. A suitable algorithm may be provided in data gateway 30 that implements the information from both table 60 and table 62 in order to ensure communications are diverted to the correct server in achieving optimal communications. Additionally, because relevant information is constantly being provided to data gateway 30, communication system 10 may include a number of legacy components or devices that are not necessarily configured in anticipation of interaction with data gateway 30. This allows communication system 10 to achieve considerable flexibility in being able to be implemented in any suitable environment.

Processor 64 is a programmable element that may include instructions or code for processing data or information in communication system 10. Processor 64 may interact with an interface provided within data gateway in order to facilitate decision-making actions effectuated by data gateway 30. Processor 64 may also assist in analyzing all information provided to data gateway 30 (e.g. user-configurable information and feedback data) in order to distribute information optimally in communication system 10. Processor 64 may include any suitable algorithm, hardware, software, or any other element that facilitates a decision-making process for distributing or managing data or information. Processor 64 may be a field programmable gate array (FPGA), an electrically erasable programmable read-only memory (EEPROM), an erasable programmable read-only memory (EPROM), an application specific integrated circuit (ASIC), a microprocessor, a digital signal processor (DSP), or any other suitable device, component, element, or object operable to facilitate the process of intelligently delivering or distributing information in communication system 10.

In operation of an example process flow that is used for teaching purposes only, data gateway 30 may parse or analyze a digit string (e.g. Signaling Connection Control Point (SCCP) (called party address or calling party address) or a network address (e.g. Message Transfer Part (MTP) Point Code) in order to make a routing decision. The digit string, for the purpose of throttling or distribution, may be an E.164 address, an intermediate node's E.164 address, a receiving node's E.164 address, an ultimate recipient's directory number or an MSISDN, a sending subscriber's MSISDN, or any other suitable data segment or identifying element. The digits may be extracted from a parameter and/or protocol layer of the operator's choosing. The decision may also be made to depend on a combination of those digits with the value of one or more other parameters from one or more other layers of the operator's choosing. The user-selected parameters need not be digits. For example, a protocol identifier (PI) in a MAP layer that reflects a set of defined integer values, each value being assigned a specific meaning. Addresses may generally take the form of digits or digit strings.

Either or both of tables 60 and 62 may be configured to contain the digit patterns or point codes that trigger the throttling or distribution. The digit patterns can be leading substrings of the addresses defined by the addressing scheme (dialing plan) used in the network. Either of tables 60 and 62 may be configured statically or actualized/updated by an intelligent remote server where appropriate.

The throttling or distribution decision may be based on message admission timers, for example an overall duration of delivery attempts along with the number of times to retry with a retry jitter component, or based on a relative importance (priority or weight) of the translation result (address). Such parameters (priorities, timers, jitter, retry attempts, etc.) may be updated dynamically on demand by authorized network entities using the publicly exported API. These parameters may be determined by the sender and may be based on any local criteria. In an example scenario, the sender is another functional entity in the same node. The node implementing this operation may follow those instructions where appropriate.

In an example embodiment, the API may be a function call in cases where the functional entity determining the throttling and distribution parameters resides in the same physical hardware as the entity performing the throttling and distribution. Alternatively, the API may be a well-defined, but proprietary, message interface or provided in any other suitable format at any adequate location where appropriate and in accordance with particular needs.

Figure 4:
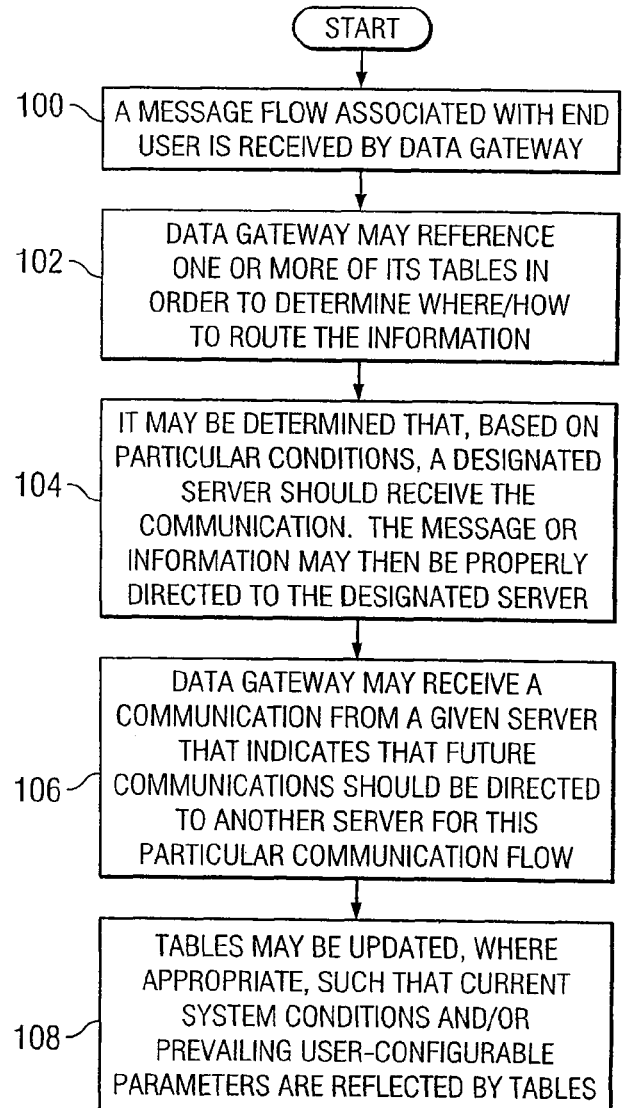
FIG. 4 is a flowchart illustrating a series of example steps associated with a method for distributing data in a network environment.

FIG. 4 is a simplified flowchart illustrating a series of example steps associated with a method for distributing information or data in communication system 10. The method may begin at step 100 where a message flow associated with end user 12 is received by data gateway 30. Data gateway 30 may reference each of its tables 60 and 62, at step 102, in order to determine where or how to route the information. At step 104, it may be determined that, based on particular conditions, server 40b should receive the communication. The message or information may then be intelligently directed to server 40b where it may be further massaged, filtered, screened, or otherwise processed or managed. The given server 40b may then store the message until the intended recipient is prepared to receive it. At step 106, data gateway 30 may receive a communication from the given server 40b that indicates that future communications should be directed to another server for this particular data stream. This conclusion may be surmised or deduced by the particular receiving server or by a neighboring server (or an external entity) viewing information associated with the communication flow. The conclusion may be based on any identity characteristic associated with end user 12. Thus, a given server may determine that a similar message should be routed to another geographical location or another component or device that would more appropriately deliver the information to its intended recipient. At step 108, each of tables 60 and 62 may be updated, where appropriate, such that current system conditions and prevailing user-specified parameters are reflected by tables 60 and 62. Alternatively, such updates may be provided at any other suitable time during the information distribution process.

Some of the steps illustrated in FIG. 4 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 4, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal components.

In addition, although the preceding description offers a distribution protocol to be implemented with particular devices (e.g. data gateway 30), the distribution protocol provided may be embodied in a fabricated module that is designed specifically for effectuating the distribution techniques as described above. Moreover, such a module may be compatible with any appropriate protocol other than the protocols provided above, which were offered for purposes of teaching and example only.

Additionally, although the present invention has been described with reference to a particular environment, communication system 10 may be provided in any application where the corresponding system is capable of distributing information based on a particular parameter. Such environments may include Ethernet, asynchronous transferred mode (ATM), frame relay, X.25, or any other suitable environment or system where data or information is distributed, managed, or otherwise directed. Moreover, elements included within RAN equipment 14 or elements such as SS7 network 26 and IP network 28 may be deleted or replaced with any other suitable components or elements that provide an appropriate network configuration, which offers adequate connectivity for end user 12 and/or servers 40a-c.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for distributing information in a network environment, comprising:
   receiving, at a data gateway, a communication flow from an end user;
   facilitating, by the data gateway, routing of the communication flow to one of a plurality of servers according to a routing decision, wherein the routing decision is based on:
   one or more user-specified parameters;
   feedback received at the data gateway from the plurality of servers that indicates an availability of each of the plurality of servers to process the communication flow;
   one or more timers providing a duration of message delivery attempts and a retry parameter;
   storing, in a first table at the data gateway, the feedback received from the plurality of servers that indicates an availability of each of the plurality of servers to process the communication flow; and storing, in a second table at the data gateway, the user-specified parameters, wherein the second table is updated to include modifications to the user-specified parameters and additional entries that indicate one or more new user-specified parameters.

2. The method of claim 1, wherein one or more of the servers are configured to provide the feedback autonomously such that the data gateway is not required to solicit one or more of the servers in order to receive the feedback.

3. The method of claim 1, further comprising combining information associated with one or more of the user-specified parameters and information associated with the feedback to determine an optimal server at which to deliver the communication flow.

4. The method of claim 3, wherein the feedback is provided dynamically to the data gateway in response to a particular condition associated with one or more of the servers being encountered.

5. The method of claim 1, wherein the communication flow comprises signaling traffic associated with a selected one of a voice call and a data message.

6. The method of claim 1, wherein facilitating routing of the communication flow comprises facilitating routing of the communication flow using a selected one of a digit string and a network address parameter.

7. The method of claim 1, wherein the first table further maintains a selected one of a digit pattern and a network address.

8. An apparatus for distributing information in a network environment, comprising:
  an interface to receive a communication flow from an end user; and
  a processor to facilitate routing of the communication flow to one of a plurality of servers according to a routing decision, wherein the routing decision is based on:
    one or more user-specified parameters;
    feedback received from the plurality of servers that indicates an availability of each of the plurality of servers to process the communication flow; and
    one or more timers providing a duration of message delivery attempts and a retry parameter;
  a first memory to store the feedback received from the plurality of servers that indicates an availability of each of the plurality of the servers to process the communication flow; and
  a second memory to store the user-specified parameters, wherein the second memory is updated to include modifications to the user-specified parameters and additional entries that indicate one or more new user-specified parameters.

9. The apparatus of claim 8, wherein the processor combines information associated with one or more of the user-specified parameters and information associated with the feedback to determine an optimal server at which to deliver the communication flow.

10. The apparatus of claim 8, wherein the feedback is provided dynamically to the apparatus in response to a particular condition associated with one or more of the servers being encountered.

11. The apparatus of claim 8, wherein the communication flow comprises signaling traffic associated with a selected one of a voice call and a data message.

12. The apparatus of claim 8, wherein facilitating routing of the communication flow comprises facilitating routing of the communication flow using a selected one of a digit string and a network address parameter.

13. The apparatus of claim 8, wherein the first memory further maintains a selected one of a digit pattern and a network address.

14. A system for distributing information in a network environment, comprising:
  means for receiving a communication flow from an end user;
  means for facilitating routing of the communication flow to one of a plurality of servers according to a routing decision, wherein the routing decision is based on:
    one or more user-specified parameters;
    feedback received from the plurality of servers that indicates an availability of each of the plurality of servers to process the communication flow; and
    one or more timers providing a duration of message delivery attempts and a retry parameter;
  a first means for storing the user-specified parameters, wherein the first means for storing is updated to include modifications to the user-specified parameters and additional entries to the first means for storing that indicate one or more new user-specified parameters; and
  a second means for storing the feedback received from the plurality of servers that indicates an availability of each of the plurality of servers to process the communication flow.

15. The system of claim 14, wherein the second means for storing further maintains a selected one of a digit pattern and a network address.

* * * * *